(12) United States Patent
Zou

(10) Patent No.: US 10,013,128 B2
(45) Date of Patent: Jul. 3, 2018

(54) TOUCH SENSING ELECTRODE, AND TOUCH SENSING METHOD AND DEVICE

(71) Applicant: BOE TECHNOLOGY GROUP CO., LTD., Beijing (CN)

(72) Inventor: Xiangxiang Zou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/529,781

(22) PCT Filed: Mar. 3, 2016

(86) PCT No.: PCT/CN2016/075460
§ 371 (c)(1),
(2) Date: May 25, 2017

(87) PCT Pub. No.: WO2017/045375
PCT Pub. Date: Mar. 23, 2017

(65) Prior Publication Data
US 2017/0344150 A1 Nov. 30, 2017

(30) Foreign Application Priority Data
Sep. 18, 2015 (CN) .......................... 2015 1 0601331

(51) Int. Cl.
 *G09G 5/00* (2006.01)
 *G06F 3/044* (2006.01)
 (Continued)

(52) U.S. Cl.
 CPC .... *G06F 3/044* (2013.01); *G06F 2203/04112* (2013.01); *G06Q 20/1085* (2013.01); *G07F 19/20* (2013.01)

(58) Field of Classification Search
 CPC .. G06F 2203/04111; G06F 2203/04112; G06F 3/044; G06F 3/0414; G06F 3/047; H05K 1/0289
 (Continued)

(56) References Cited

U.S. PATENT DOCUMENTS 9,000,780 B2 4/2015 Fukushima
9,563,294 B2 2/2017 Lee
(Continued)

FOREIGN PATENT DOCUMENTS

CN 102221919 A 10/2011
CN 102866813 A 1/2013
(Continued)

OTHER PUBLICATIONS

International Search Report of PCT/CN2016/075460 in Chinese, dated Jun. 17, 2016 with English translation.
(Continued)

*Primary Examiner* — Jennifer Nguyen
(74) *Attorney, Agent, or Firm* — Collard & Roe, P.C.

(57) ABSTRACT

Disclosed are a touch detection electrode, a touch detection method and a touch detection device. The touch detection electrode can realize ordinary capacitive touch by inputting corresponding sensing signals to a part of or all touch sensing electrodes in a first time period; and can realize force touch by inputting corresponding sensing signals to a part or all of the touch sensing electrodes in a second time period. That is, the determination of touch coordinate and the sensing of pressure can be simultaneously realized by driving the ordinary capacitive touch and the pressure touch in time division mode.

11 Claims, 4 Drawing Sheets

(51) Int. Cl.
*G06Q 20/10* (2012.01)
*G07F 19/00* (2006.01)

(58) Field of Classification Search
USPC .............................. 345/173–174; 178/18.06
See application file for complete search history.

(56) References Cited

U.S. PATENT DOCUMENTS

| | | |
|---|---|---|
| 2013/0307789 A1 | 11/2013 | Karamath et al. |
| 2015/0138104 A1 | 5/2015 | Sugita |
| 2015/0268751 A1 | 9/2015 | Wu et al. |
| 2016/0062537 A1* | 3/2016 | Kim ...................... G06F 3/0416 345/174 |

FOREIGN PATENT DOCUMENTS

| | | |
|---|---|---|
| CN | 103257740 A | 8/2013 |
| CN | 103870074 A | 6/2014 |
| CN | 103941942 A | 7/2014 |
| CN | 104461162 A | 3/2015 |
| CN | 105045437 A | 11/2015 |
| CN | 105373248 A | 3/2016 |

OTHER PUBLICATIONS

Written Opinion of the International Searching Authority of PCT/CN2016/075460 in Chinese, dated Jun. 17, 2016 with English translation.
Chinese Office Action in Chinese Application No. 201510601331.5, dated Jul. 24, 2017 with English translation.

* cited by examiner

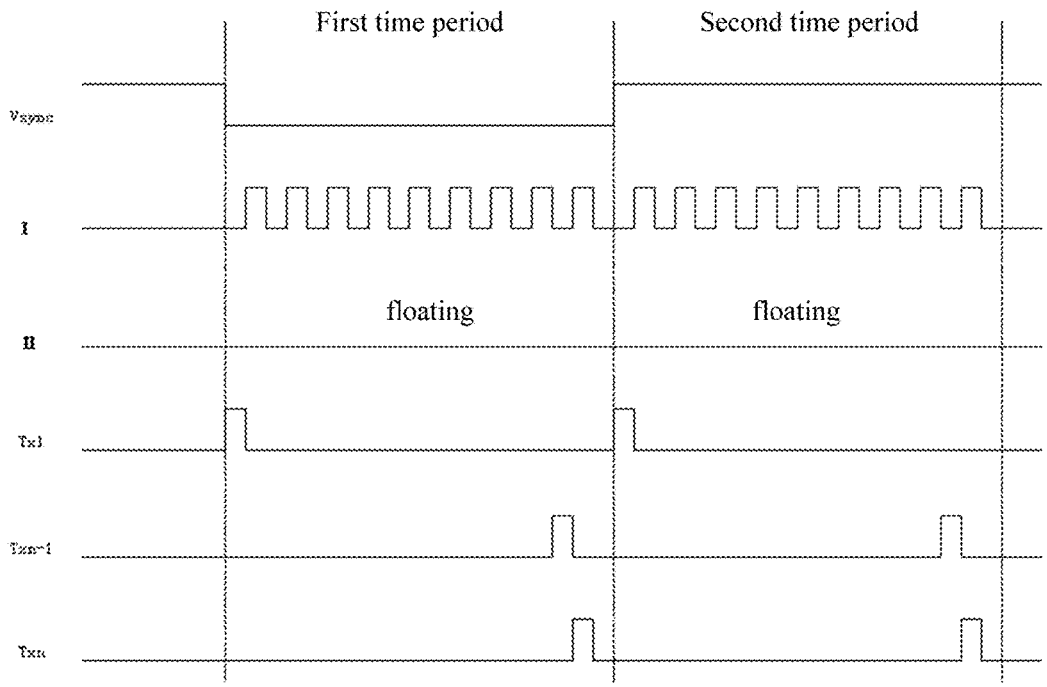

Fig.5

601 during the first time period, according to a set first scanning period, inputting scanning signals to the touch driving electrodes line-by-line, detecting the touch signals outputted by the touch sensing electrodes connected with the sensing signals during each of the first scanning period, and determining a coordinate of a touch object acting on the touch detecting electrode according to detected touch signals outputted by the touch sensing electrodes connected with sensing signals during each of the first scanning period

602 during a second time period, according to a set second scanning period, inputting scanning signals to the touch driving electrodes line-by-line, and detecting the touch signals outputted by the touch sensing electrodes connected with sensing signals during each of the second scanning period, and determining a size of pressure acting on the touch detecting electrode according to detected touch signals outputted by the touch sensing electrodes connected with the sensing signals during each of the second scanning period

Fig. 6

TOUCH SENSING ELECTRODE, AND TOUCH SENSING METHOD AND DEVICE

CROSS REFERENCE TO RELATED APPLICATIONS

This application is the National Stage of PCT/CN2016/075460 filed on Mar. 3, 2016, which claims priority under 35 U.S.C. § 119 of Chinese Application No. 201510601331.5 filed on Sep. 18, 2015, the disclosure of which is incorporated by reference.

TECHNICAL FIELD

Embodiments of the present invention relates to a touch detection electrode, a touch detection method and a touch detection device.

BACKGROUND

With the continuous development of touch technology, it has permeated in every aspects of people's life. For example, most Automatic Telling Machines (ATMs) of banks have touch function, the computers in hospital and library, and the electronic products such as personal cellphones and digital cameras have touch function.

SUMMARY

At least one embodiment of the present invention provides a touch detection electrode, and a touch detection method and device based on the touch detection electrode, so as to solve the problems such as complex technical realization and relatively high costs upon realizing capacitive force touch in ordinary touch devices.

At least one embodiment of the present invention provides A touch detection electrode, comprising a plurality of touch driving electrodes and a plurality of touch sensing electrodes, wherein, during a first time period, a part of the plurality of touch sensing electrodes serve as first sensing electrodes connected with corresponding sensing signals, another part of the plurality of touch sensing electrodes serve as second sensing electrodes connected with floating signals or corresponding sensing signals, the touch sensing electrodes connected with the sensing signals output corresponding touch signals; a second time period comprises at least one sub time period, during each sub time period of the second time period, a part of the plurality of touch sensing electrodes serve as the first sensing electrodes connected with corresponding sensing signals, another part of the plurality of touch sensing electrodes serve as the second sensing electrodes connected with floating signals or corresponding sensing signals, the touch sensing electrodes connected with the sensing signals output corresponding touch signals, wherein, in each time period or each sub time period, adjacent ones of the touch sensing electrodes serving as the first sensing electrodes are spaced by at least one of the touch sensing electrodes serving as the second sensing electrodes.

Furthermore, at least one embodiment of the present invention further provides a touch detection method based on the touch detection electrode according to at least one embodiment of the present invention, comprising: during the first time period, according to a set first scanning period, inputting scanning signals to the touch driving electrodes line-by-line, detecting the touch signals outputted by the touch sensing electrodes connected with the sensing signals during each of the first scanning period, and determining a coordinate of a touch object acting on the touch detection electrode according to the detected touch signals outputted by the touch sensing electrodes connected with sensing signals during each of the first scanning period; during a second time period, according to a set second scanning period, inputting scanning signals to the touch driving electrodes line-by-line, and detecting the touch signals outputted by the touch sensing electrodes connected with the sensing signals during each of the second scanning period, and determining a size of pressure acting on the touch detection electrode according to the detected touch signals outputted by the touch sensing electrodes connected with the sensing signals during each of the second scanning period.

Furthermore, at least one embodiment of the present invention further provides a touch detection device based on the touch detection electrode according to at least one embodiment of the present invention, comprising: a detecting unit, configured to, during the first time period, according to a set first scanning period, input scanning signals to the touch driving electrodes line-by-line, and detect touch signals outputted by the touch sensing electrodes connected with sensing signals in each of the first scanning period; and, during the second time period, according to a set second scanning period, input scanning signals to the touch driving electrodes line-by-line, and detect touch signals outputted by the touch sensing electrodes connected with the sensing signals in each of the second scanning period; a processing unit, configured to determine a coordinate of a touch object acting on the touch detection electrode according to the touch signals outputted by the touch sensing electrodes connected with the sensing signals in each of the first scanning period in the first time period; and determine a size of the pressure acting on the touch detection electrode according to the touch signals outputted by the touch sensing electrodes connected with the sensing signals in each of the second scanning period in the second time period.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 5 is another schematic diagram of signal connection sequence control of touch sensing electrodes provided by the first embodiment of the present invention;

FIG. 6 is a flow schematic diagram of a touch detection method provided by a second embodiment of the present invention;

DETAILED DESCRIPTION

Figure 1:
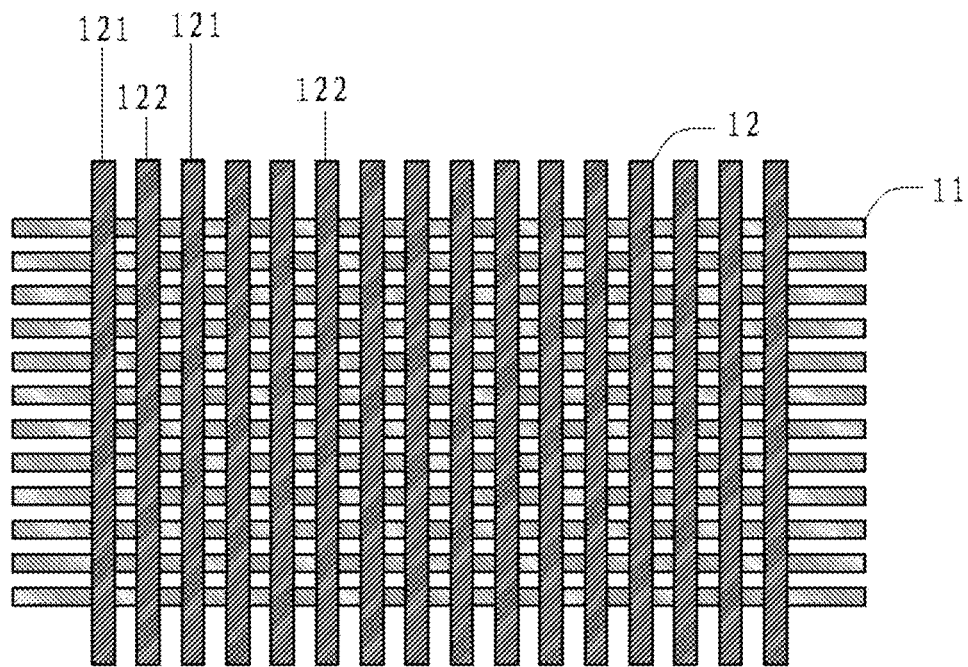
FIG. 1 is a structural schematic diagram of a touch detection electrode provided by a first embodiment of the present invention.

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

An ordinary touch device can only realize the determination of a coordinate of a touch point, but cannot sense the pressure; with the requirements of experience degree on touch device becoming more and more high, it is hard for an ordinary touch device to provide good user experience.

In order to solve the abovementioned problem and provide experience and operations in more dimensions for the user, the force touch technology can be applied to a touch device. For example, a case where a capacitive force touch technology is applied to a touch device is taken as an example, because the principle of the capacitive force touch is that the pressure changes a distance between two electrodes at two sides of a capacitor, so as to change the capacitance, thus, the force touch can be realized by detecting the capacitance variation. That is, the realization of force touch through this mode requires a deformation. Therefore, for a touch device, a special configuration is usually needed. For example, generally, two layers of strip electrodes are additionally disposed to realize the force touch on the current technological structure of the touch device, in this way, the technical realization of the touch device is complex, and the costs of hardware are increased.

First Embodiment

The present embodiment provides a touch detection electrode, for example, as illustrated by FIG. 1, which is a structural schematic diagram of the touch detection electrode, the touch detection electrode comprises a plurality of touch driving electrodes 11 and a plurality of touch sensing electrodes 12. For example, the plurality of touch driving electrodes 11 extend along a first direction, the plurality of touch sensing electrodes 12 extend along a second direction which is different from the first direction and are located in different layers with the touch driving electrodes 11. A case where the second direction is perpendicular to the first direction is described as an example in FIG. 1. For example, a layer where the plurality of touch driving electrodes 11 are located and a layer where the plurality of touch sensing electrodes 12 are located can be provided with an insulating layer therebetween.

During a first time period, a part of the plurality of touch sensing electrodes 12 serve as first sensing electrodes 121 connected with corresponding sensing signals, another part of the plurality of touch sensing electrodes 12 serve as second sensing electrodes 122 connected with floating signals or corresponding sensing signals. For example, two adjacent touch sensing electrodes connected with sensing signals form an electrode group, and every touch sensing electrode connected with sensing signal only belongs to one electrode group. The touch sensing electrodes in each electrode group formed by two adjacent touch sensing electrodes connected with the sensing signals share the same sensing signal (i.e., two adjacent touch sensing electrodes connected with the sensing signals are connected with the same sensing signal source), in this way, a plurality of U shaped receiving electrodes can be formed, but which is not limited herein. The touch sensing electrodes connected with the sensing signals output corresponding touch signals. For example, in the present disclosure, the floating signals refer to that no electrical signal is applied.

During each sub time period of a second time period, a part of the plurality of touch sensing electrodes 12 serve as the first sensing electrodes 121 connected with corresponding sensing signals, another part of the plurality of touch sensing electrodes 12 serve as the second sensing electrodes 122 connected with floating signals or corresponding sensing signals, the touch sensing electrodes connected with the sensing signals output corresponding touch signals.

During each time period or each sub time period, adjacent touch sensing electrodes serving as the first sensing electrodes 121 are spaced with at least one touch sensing electrode serving as the second sensing electrode 122. For example, each time period comprises the first time period and/or the second time period.

That is to say, during the first time period, an effect of ordinary capacitive touch can be realized by inputting part of or all touch sensing electrodes of the plurality of touch sensing electrodes with corresponding sensing signals. During the second time period, an effect of force touch can be realized by inputting part of or all touch sensing electrodes of the plurality of touch sensing electrodes with corresponding sensing signals. That is to say, the determination of a coordinate and the force touch of touch can be simultaneously realized by driving the ordinary capacitive touch and force touch in a time-division mode, so as to improve the experience degree of user without increasing the technological complexity of the touch device and the costs of hardware.

Optionally, during each sub time period of the second time period, generally, the touch sensing electrodes connected with the sensing signals can be connected with different sensing signal sources, so as to keep the signal independence among them. Certainly, it is to be noted that, during each sub time period of the second time period, any two touch sensing electrodes connected with sensing signals can be connected with the same sensing signal source. For example, two adjacent touch sensing electrodes connected with sensing signals are connected with the same sensing signal source, the repeated portions will be omitted herein.

For example, because the achieved touch performance is relatively good upon two adjacent touch sensing electrodes connected with sensing signals being spaced with one or more touch sensing electrodes connected with floating signals, in an exemplary example of the present embodiment, during the first time period, the second sensing electrodes 122 can be inputted with corresponding floating signals upon inputting corresponding sensing signals to the first sensing electrodes 121, so as to improve the touch performance of ordinary capacitive touch.

Figure 2:
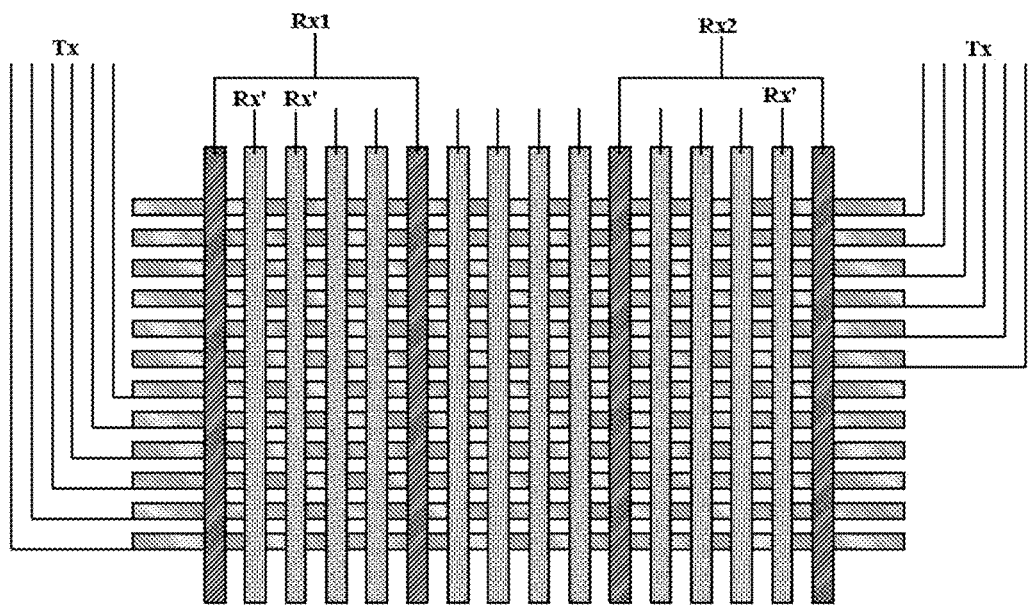
FIG. 2 is a schematic diagram of connection of touch sensing electrodes during a first time period provided by the first embodiment of the present invention.

For example, as illustrated by FIG. 2, the first, the sixth, the eleventh, the and the sixteenth touch sensing electrodes from the left to the right can be inputted with corresponding sensing signals (for example, the first and the sixth touch sensing electrodes are inputted with sensing signal Rx1, the eleventh and the sixteenth touch sensing electrodes are inputted with sensing signal Rx2, i.e., the first and the sixth touch sensing electrodes form an electrode group, the eleventh and the sixteenth touch sensing electrodes form another electrode group); the touch sensing electrodes between the first and the sixth touch sensing electrodes, the touch sensing electrodes between the sixth and the eleventh touch sensing electrodes, and the touch sensing electrodes between the eleventh and the sixteenth touch sensing electrodes are inputted with floating signals Rx', so as to achieve an effect that two adjacent touch sensing electrodes connected with sensing signals are spaced with one or more touch sensing electrodes connected with floating signals.

Similarly, during each sub time period of the second time period, generally, the second sensing electrodes 122 can be inputted with corresponding floating signals upon corresponding sensing signals being input to the first sensing electrodes 121, so as to improve the touch performance of force touch.

Figure 3:
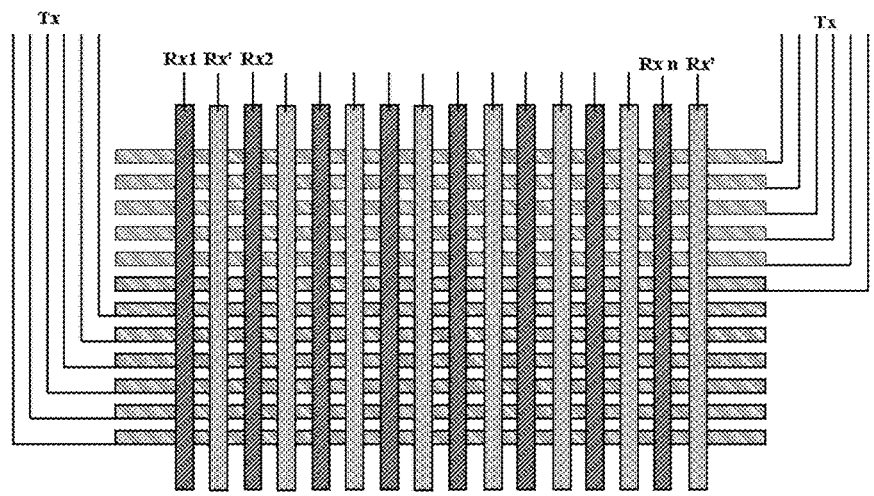
FIG. 3 is a schematic diagram of connection of touch sensing electrodes during a second time period provided by the first embodiment of the present invention.

For example, as illustrated by FIG. 3, the touch sensing electrodes of the odd number columns from the left to the right are inputted with corresponding sensing signals (for example, the first touch sensing electrode is inputted with a sensing signal Rx1, and the third touch sensing electrode is inputted with a second signal Rx2, and so on); the touch sensing electrodes of the even number columns are inputted with corresponding floating signals Rx', so as to achieve the effect that that two adjacent touch sensing electrodes connected with sensing signals are spaced with one or more touch sensing electrodes connected with floating signals.

It is to be noted that, during each time period or each sub time period, the touch sensing electrode located at any one of the edges of the plurality of touch sensing electrodes 12 can serve as the first sensing electrode 121 the second sensing electrode 122.

Optionally, during the first time period, the sensing signals corresponding two adjacent electrode groups each of which is formed by two adjacent touch sensing electrodes connected with the sensing signals are the same or different. For example, in FIG. 2, Rx1 and Rx2 can be the same sensing signals or different sensing signals. It is to be noted that, the same sensing signals herein are sensing signals having the same frequency and amplitude, but not limited to be connected with the same sensing signal source.

For example, during the first time period, although the sensing signals corresponding two adjacent electrode groups each of which is formed by two adjacent touch sensing electrodes connected with sensing signals are the same, the adjacent electrode groups can also be connected with different sensing signal sources.

Optionally, during the second time period, the sensing signals corresponding to two adjacent touch sensing electrodes connected with sensing signals are the same or different. Even if the sensing signals are the same, the adjacent touch sensing electrodes can also be connected with different sensing signal sources. For example, as illustrated by FIG. 3, Rx1 and Rx2 can be the same sensing signal or different sensing signals, even if Rx1 and Rx2 are the same, the two sensing signals can come from different signal sources.

Furthermore, for example, the second time period can comprise one or more sub time period, which can be flexibly set according to the practical requirements.

For example, a case where the second time period comprises two sub time periods, during each sub time period, adjacent touch sensing electrodes serving as the first sensing electrodes 121 are spaced with a touch sensing electrode serving as the second sensing electrode 122 is taken as an example. During each sub time period of the second time period, a part of the plurality of touch sensing electrodes 12 serve as the first sensing electrodes 121 connected with corresponding sensing signals, another part of the touch sensing electrodes of the plurality of touch sensing electrodes 12 serve as the second sensing electrodes 122 connected with floating signals, which can comprise:

during a first sub time period of the second time period, the touch sensing electrodes of the odd number columns of the plurality of touch sensing electrodes 12 serve as the first sensing electrodes 121 connected with corresponding sensing signals, and the touch sensing electrodes of the even number columns serve as the second sensing electrodes 122 connected with floating signals; during a second sub time period of the second time period, the touch sensing electrodes of the odd number columns of the plurality of touch sensing electrodes 12 serve as the second sensing electrodes 122 connected with floating signals, and the touch sensing electrodes of the even number columns of the plurality of touch sensing electrodes 12 serve as the first sensing electrodes 121 connected with corresponding sensing signals; or, during the first sub time period of the second time period, the touch sensing electrodes of the odd number columns of the plurality of touch sensing electrodes 12 serve as the second sensing electrodes 122 connected with floating signals, and the touch sensing electrodes of the even number columns serve as the first sensing electrodes 121 connected with corresponding sensing signals; during a second sub time period of the second time period, the touch sensing electrodes of the odd number columns of the plurality of touch sensing electrodes 12 serve as the first sensing electrodes 121 connected with corresponding sensing signals, and the touch sensing electrodes of the even number columns serve as the second sensing electrodes 122 connected with floating signals.

Furthermore, for example, with regard to any one of the touch sensing electrodes 12, a width W of any one of the touch sensing electrodes 12 can meet a formula:

$$W = \frac{R_s \times L}{R} = \frac{\rho \times L}{D \times R};$$

In the abovementioned formula, W refers to a line width of the touch sensing electrode 12, $R_s$ refers to a square resistance of the touch sensing electrode 12, L refers to a length of the touch sensing electrode 12, R refers to a line resistance of the touch sensing electrode 12, ρ refers to a resistivity of the material of the touch sensing electrode 12, and D is a thickness of the touch sensing electrode 12.

Because the current IC requires that the line resistance of the electrode is smaller than or equal to 30 KΩ, i.e., R≤30 KΩ, thus, the width W of any one of the touch sensing electrode 12 generally meets:

$$W \geq \frac{R_s \times L}{30\ K\Omega} = \frac{\rho \times L}{D \times 30\ K\Omega}.$$

Besides, it is to be noted that, similar to an ordinary technology, the distance between two adjacent touch sensing electrodes generally is on the order of a micrometer, and can be set according to the practical requirements, which is not limited herein.

Moreover, it is to be noted that, similar to an ordinary technology, the material of the electrodes adopted in the embodiments of the present invention can be a metal conductive material, such as copper (Cu), or, a nonmetal conductive material, such as indium tin oxide (ITO), nanometer silver (AgN), grapheme, and carbon nano-tube, which is not limited herein.

Hereafter, the signal connection situation of the touch sensing electrodes of the present embodiment is briefly described through two specific examples.

First Example

Figure 4:
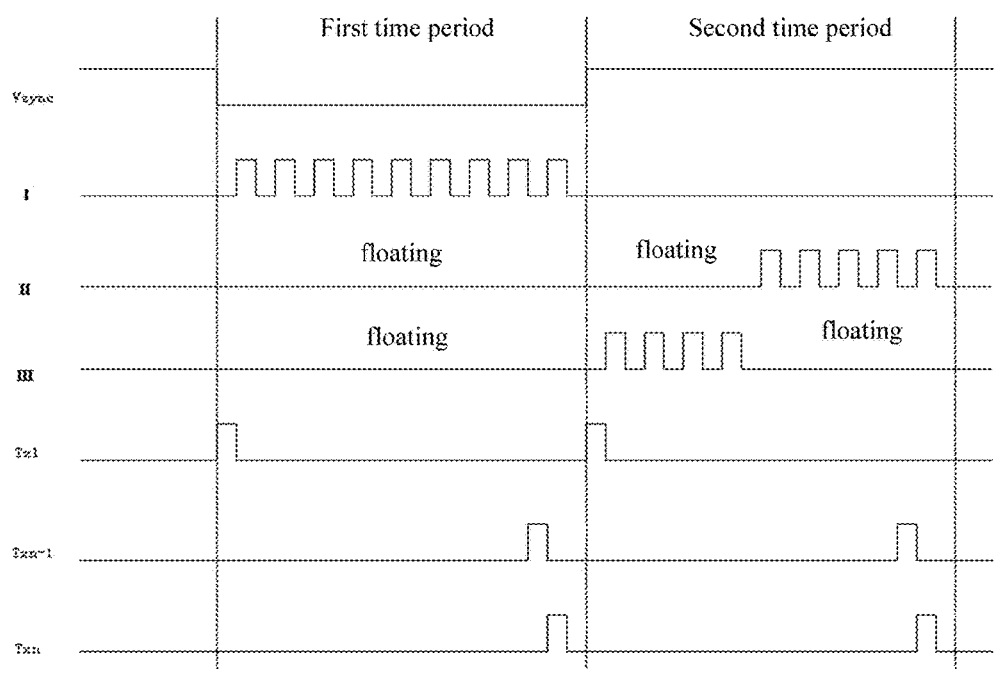
FIG. 4 is a schematic diagram of signal connection sequence control of touch sensing electrodes provided by the first embodiment of the present invention.

As illustrated by FIG. 4, during the first time period, a part of the touch sensing electrodes can be inputted with sensing signals I, a part of touch sensing electrodes can be inputted with floating signals II or III, so as to form a plurality of U shaped receiving electrodes; in this way, under the line sequence scanning of the touch driving electrodes, U shaped receiving electrodes output the capacitance variation situation, and a coordinate of the touch point can be determined by detecting the capacitance variation situation. At this time, the touch sensing electrodes inputted with sensing signals I can be regarded as the first sensing electrodes, the touch sensing electrodes inputted with floating signals II or III can be regarded as the second sensing electrodes.

During the second time period, the touch sensing electrodes of the odd number columns are inputted with signals II of floating signals during the first sub time period and sensing signals during the second sub time period, the touch sensing electrodes of the even number columns are inputted with signals III of sensing signals during the first sub time period and floating signals during the second sub time period. In this way, under the line sequence scanning of the touch driving electrodes, the touch sensing electrodes inputted with corresponding sensing signals output the capacitance variation situation, the sensing of the size of the pressure can be realized by performing analysis and processing on the capacitance variation situation of the touch sensing electrodes. At this time, as illustrated by FIG. 4, during the first sub time period of the second time period, the touch sensing electrodes of the odd number columns can be regarded as the second sensing electrodes, the touch sensing electrodes of the even number columns can be regarded as the first sensing electrodes; during the second sub time period of the second time period, the touch sensing electrodes of the odd number columns can be regarded as the first sensing electrodes, the touch sensing electrodes of the even number columns can be regarded as the second sensing electrodes.

Second Example

As illustrated by FIG. 5, during the first time period, a part of the touch sensing electrodes can be inputted with sensing signals I, and a part of the touch sensing electrodes can be inputted with floating signals II, so as to form a plurality of U shaped receiving electrodes; under the line sequence scanning of the touch driving electrodes, the U shaped receiving electrodes output the capacitance variation situation, and a coordinate of the touch point can be determined by detecting the capacitance variation situation. At this time, the touch sensing electrodes inputted with sensing signals I can be regarded as the first sensing electrodes, and the touch sensing electrodes inputted with floating signals II can be regarded as the second sensing electrodes.

During the second time period, the touch sensing electrodes of the odd number columns can be inputted with sensing signals I, and the touch sensing electrodes of the even number columns can be inputted with floating signals II. In this way, under the line sequence scanning of the touch driving electrodes, the touch sensing electrodes inputted with corresponding sensing signals output the capacitance variation situation, and the sensing of the size of the pressure can be realized by performing analysis and processing on the capacitance variation situation of the touch sensing electrodes. At this time, as illustrated by FIG. 5, during the second time period, the touch sensing electrodes of the odd number columns can always be regarded as the first sensing electrodes, and the touch sensing electrodes of the even number columns can always be regarded as the second sensing electrodes.

Besides, it is to be noted that, a case where ordinary capacitive touch is conducted upon Vsync being a low voltage and force touch is conducted upon Vsync being a high voltage is described as an example in FIG. 4 and FIG. 5. It is to be noted that, ordinary capacitive touch can be conducted upon Vsync being a high voltage and force touch can be conducted upon Vsync being a low voltage, which is not limited herein.

The present embodiment provides a touch detection electrode, during a first time period, ordinary capacitive touch can be realized by inputting part of or all touch sensing electrodes of the plurality of touch sensing electrodes with corresponding sensing signals. During the second time period, force touch can be realized by inputting part of or all touch sensing electrodes of the plurality of touch sensing electrodes with corresponding signals. That is to say, the determination of touch coordinate and sensing of pressure can be simultaneously realized by driving the ordinary capacitive touch and the force touch in a time-sharing mode, so as to improve experience degree of user without increasing the technological complexity and costs of hardware of the touch device.

Second Embodiment

The present embodiment provides a touch detection method based on the touch detection electrode according to the first embodiment. For example, as illustrated by FIG. 6, which is a flow schematic diagram of a touch detection method, the touch detection method comprises the following steps.

Step 601: during the first time period, according a set first scanning period, inputting scanning signals to the touch driving electrodes line-by-line, and detecting touch signals outputted by the touch sensing electrodes connected with sensing signals during each of the first scanning period, and determining a coordinate of a touch object acting on the touch detection electrode according to the detected touch signals outputted by the touch sensing electrodes connected with sensing signals during each of the first scanning period.

Step 602: during the second time period, according a set second scanning period, inputting scanning signals to the touch driving electrodes line-by-line, and detecting touch signals outputted by the touch sensing electrodes connected with sensing signals during each of the second scanning period, and determining a size of pressure acting on the touch detection electrode according to the touch signals outputted by the touch sensing electrodes connected with sensing signals during each of the second scanning period.

For example, determining a coordinate of a touch object acting on the touch detection electrode according to the detected touch signals outputted by the touch sensing electrodes connected with sensing signals during each of the first scanning period, comprises:

determining a signal variation value which is not smaller than a first threshold value, the touch sensing electrode and the first scanning period corresponding to the signal variation value which is not smaller than a first threshold value according to the touch signals outputted by the touch sensing electrodes connected with sensing signals during each of the first scanning period, and determining a coordinate of an intersection point of the determined touch sensing electrode and a touch driving electrode corresponding to the first scanning period as a coordinate of the touch object acting on the touch detection electrode.

For example, determining a size of pressure acting on the touch detection electrode according to the touch signals outputted by the touch sensing electrodes connected with sensing signals during each of the second scanning period, comprises:

determining a touch sensing electrode whose corresponding signal variation value is not smaller than the second threshold value according to the detected touch signals outputted by the touch sensing electrodes connected with sensing signals during each of the second scanning period, and performing a comprehensive analysis to the signal variation value corresponding to the touch sensing electrode, so as to obtain a size of pressure acting on the touch detection electrode.

It is to be noted that, the first scanning period and the second scanning period can be flexibly set according to the requirements, and the first scanning period and the second canning period can be equal or not equal, and limitations are not imposed to the present embodiment.

Besides, it is to be noted that the first threshold value and the second threshold value can be flexibly set according to the requirements, however, in order to guarantee the accuracy of the calculation result of touch, generally, the first threshold value and the second threshold value can be respectively set as high values, and repeated portions are omitted herein.

Figure 7:
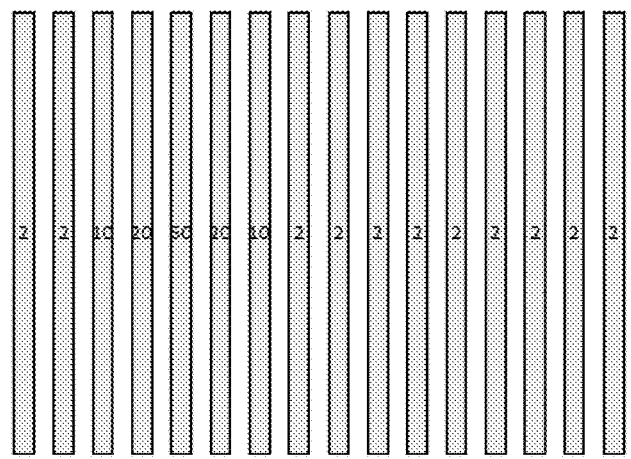
FIG. 7 is a schematic diagram of detected values of the touch sensing electrodes upon being subjected to force touch provided by the second embodiment of the present invention.
Figure 8:
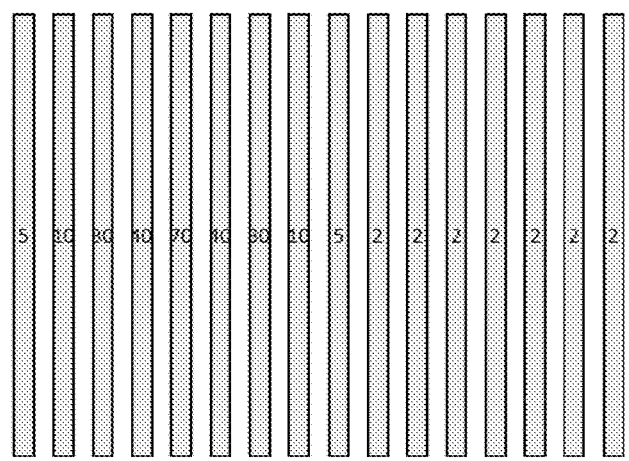
FIG. 8 is another schematic diagram of detected values of the touch sensing electrodes upon being subjected to force touch provided by the second embodiment of the present invention.

Furthermore, it is to be noted that, the contact area of the touch object and the touch device increases upon the pressure of the touch object (such as: finger and touch pen) on the touch device increasing, as a result, capacitance values of more touch sensing electrodes changes. The size of pressure acting on the touch detection electrode can be obtained by performing analysis and processing to the capacitance variation values of all touch sensing electrodes at this time. For example, FIG. 7 and FIG. 8 respectively list schematic diagrams illustrating detected values of the touch sensing electrodes upon being touched by two different levels of pressure (at this time, it is defaulted that all touch sensing electrodes are connected with corresponding sensing signals), and the force touch can be realized by performing analysis and processing on the detected values of all touch sensing electrodes.

Third Embodiment

Figure 9:
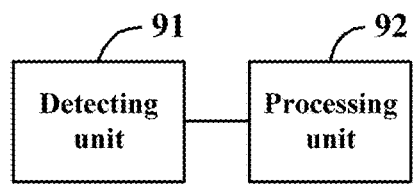
FIG. 9 is a structural schematic diagram of a touch detection device provided by a third embodiment of the present invention.

Based on the same invention concept, the present embodiment provides a touch detection device based on the touch detection electrode according to the first embodiment. For example, as illustrated by FIG. 9, which is a structural schematic diagram of a touch detection device, comprising:

a detecting unit 91, configured to, during the first time period, according a set first scanning period, input scanning signals to the touch driving electrodes line-by-line, and detect touch signals outputted by the touch sensing electrodes connected with sensing signals during each of the first scanning period; and during the second time period, according a set second scanning period, input scanning signals to the touch driving electrodes line-by-line, and detect touch signals outputted by the touch sensing electrodes connected with sensing signals during each of the second scanning period;

a processing unit 92, configured to determine a coordinate of a touch object acting on the touch detection electrode according to the detected touch signals outputted by the touch sensing electrodes connected with sensing signals during each of the first scanning period; and determine a size of pressure acting on the touch detection electrode according to the detected touch signals outputted by the touch sensing electrodes connected with sensing signals during each of the second scanning period.

For example, the touch detection device can comprise a driving IC, which is not limited thereto.

For example, the processing unit 92 is configured to determine a signal variation value which is not smaller than a first threshold value, and the touch sensing electrode and the first scanning period which are corresponding to the signal variation value which is not smaller than a first threshold value according to the detected touch signals outputted by the touch sensing electrodes connected with sensing signals during each of the first scanning period, and determining a coordinate of an intersection point of the determined touch sensing electrode and a touch driving electrode corresponding to the set first scanning period as the coordinate of a touch object acting to the touch detection electrode; and determine a touch sensing electrode whose corresponding signal variation value is not smaller than a second threshold value according to the touch signals outputted by the touch sensing electrodes connected with the sensing signals during each second scanning period, and determine a size of pressure acting on the touch detection electrode by performing a comprehensive analysis to the signal variation value corresponding to the determined touch sensing electrode.

It is to be noted that, the contact area between the touch object and the touch device increases upon the pressure of the touch object on the touch device increasing, as a result, the capacitance values of more touch sensing electrodes changes, the processing unit 92 can obtain the size of pressure acting on the touch detection electrode by performing analysis and processing to the capacitance variation values of all touch sensing electrodes.

Those skilled in the art shall understand that the embodiments of the present invention can be provided as method, device (apparatus), or computer program product. Therefore, the embodiments of the present invention can adopt a mode of embodiments of complete hardware, embodiments of complete software, or embodiments of a combination of software and hardware. Besides, the embodiments of the present invention can adopt a mode that the computer program product is implemented on one or more storage mediums (comprising but not limited to a disk memory, a CD-ROM, an optical memory, and the like) comprising program codes available for computer, wherein the storage mediums are available for computer, too.

The embodiments of the present invention are descried according to flow diagrams and/or block diagrams of the method, the device (apparatus), and the computer program product of the embodiments of the present invention. It shall be understood that the computer program instructions realize each flow and/or block in the flow diagrams and/or block diagrams, and a combination of the flow and/or block in the flow diagrams and/or block diagrams. These computer program instructions can be provided to a general purpose computer, a professional computer, an embedded processor, or processors of other programmable data processing devices to produce a machine, such that the instructions executed through the computer or the processors of the other programmable data processing devices are used to realize the functions designated by one flow or a plurality of flows of the flow diagrams and/or one block or a plurality of blocks of the block diagrams.

These computer program instructions can be stored in a computer readable memory which can guide the computer or other programmable data processing devices to work in a specific mode, such that the instructions stored in the computer readable memory produce manufactured object comprising the instructing devices, the instructing devices realize the functions designated by one flow or a plurality of flows of the flow diagrams or one block and/or a plurality of blocks of the block diagrams.

These computer program instructions can also be installed in a computer or other programmable data processing device, such that the computer or the other programmable data processing devices executes a series of operations and steps to produce processing realized by computer; in this way, the instructions executed in the computer or other programmable data processing device provide steps used to realize the functions designated by one flow or a plurality of flows of the flow diagrams and/or one block or a plurality of blocks of the block diagrams.

The foregoing are merely specific embodiments of the disclosure, but not limitative to the protection scope of the present disclosure. The protection scope of the disclosure should be defined by the accompanying claims.

The present disclosure claims the benefits of Chinese patent application No. 201510601331.5, which was filed on Sep. 18, 2015 and is incorporated in its entirety herein by reference as part of this application.

The invention claimed is:

1. A touch detection electrode, comprising a plurality of touch driving electrodes and a plurality of touch sensing electrodes, wherein, during a first time period, a part of the plurality of touch sensing electrodes serve as first sensing electrodes connected with corresponding sensing signals, another part of the plurality of touch sensing electrodes serve as second sensing electrodes connected with floating signals or corresponding sensing signals, the touch sensing electrodes connected with the sensing signals output corresponding touch signals;

a second time period comprises at least one sub time period, during each sub time period of the second time period, a part of the plurality of touch sensing electrodes serve as the first sensing electrodes connected with corresponding sensing signals, another part of the plurality of touch sensing electrodes serve as the second sensing electrodes connected with floating signals or corresponding sensing signals, the touch sensing electrodes connected with the sensing signals output corresponding touch signals, wherein, in each time period or each sub time period, adjacent ones of the touch sensing electrodes serving as the first sensing electrodes are spaced by at least one of the touch sensing electrodes serving as the second sensing electrodes;

wherein, the second time period comprises two sub time periods, and during each of the sub time periods, the adjacent touch sensing electrodes serving as the first sensing electrodes are provided with one of the touch sensing electrodes serving as the second sensing electrodes therebetween, during each of the sub time periods of the second time period, the part of the plurality of touch sensing electrodes serve as the first sensing electrodes connected with the corresponding sensing signals, the another part of the plurality of touch sensing electrodes serve as the second sensing electrode connected with the floating signals, comprising:

during a first sub time period of the second time period, the touch sensing electrodes of odd number columns of the plurality of touch sensing electrodes serve as the first sensing electrodes connected with the corresponding sensing signals, the touch sensing electrodes of even number columns of the plurality of touch sensing electrodes serve as the second sensing electrodes connected with the floating signals; during a second sub time period of the second time period, the touch sensing electrodes of odd number columns of the plurality of touch sensing electrodes serve as the second sensing electrodes connected with floating signals, the touch sensing electrodes of even number columns serve as the first sensing electrodes connected with the corresponding sensing signals; or during the first sub time period of the second time period, the touch sensing electrodes of odd number columns of the plurality of touch sensing electrodes serve as the second sensing electrodes connected with the floating signals, the touch sensing electrodes of even number columns of the plurality of touch sensing electrodes serve as the first sensing electrodes connected with the corresponding sensing signals; during the second sub time period of the second time period, the touch sensing electrodes of odd number columns of the plurality of touch sensing electrodes serve as the first sensing electrodes connected with the corresponding sensing signals, the touch sensing electrodes of even number columns serve as the second sensing electrodes connected with the floating signals.

2. The touch detection electrode according to claim 1, wherein, in each time period or each sub time period, the touch sensing electrode located at any one of edges of the plurality of touch sensing electrodes serves as a first sensing electrode or a second sensing electrode.

3. The touch detection electrode according to claim 1, wherein, during the first time period, the touch sensing electrodes in each of electrode groups comprising two adjacent touch sensing electrodes connected with the sensing signals share a same sensing signal.

4. The touch detection electrode according to claim 3, wherein, during the first time period, the sensing signals corresponding to two adjacent electrode groups comprising two adjacent touch sensing electrodes connected with the sensing signals are the same or different.

5. The touch detection electrode according to claim 1, wherein, during the second time period, the sensing signals corresponding to two adjacent touch sensing electrodes connected with the sensing signals are the same or different.

6. The touch detection electrode according to claim 1, wherein, with regard to any one of the touch sensing electrodes, a width W of any one of the touch sensing electrodes meets a formula:

$$W = \frac{R_s \times L}{R} = \frac{\rho \times L}{D \times R};$$

wherein, W is a line width of the touch sensing electrode, $R_s$ is a square resistance of the touch sensing electrode, L is a length of the touch sensing electrode, R is a line resistance of the touch sensing electrode, $\rho$ is a resistivity of material of the touch sensing electrode, D is a thickness of the touch sensing electrode.

7. A touch detection method based on the touch detection electrode according to claim 1, comprising:
during the first time period, according to a set first scanning period, inputting scanning signals to the touch driving electrodes line-by-line, detecting the touch signals outputted by the touch sensing electrodes connected with the sensing signals during each of the first scanning period, and determining a coordinate of a touch object acting on the touch detection electrode according to the detected touch signals outputted by the touch sensing electrodes connected with sensing signals during each of the first scanning period;
during a second time period, according to a set second scanning period, inputting scanning signals to the touch driving electrodes line-by-line, and detecting the touch signals outputted by the touch sensing electrodes connected with the sensing signals during each of the second scanning period, and determining a size of pressure acting on the touch detection electrode according to the detected touch signals outputted by the touch sensing electrodes connected with the sensing signals during each of the second scanning period.

8. The touch detection method according to claim 7, wherein, determining the coordinate of the touch object acting on the touch detection electrode according to the detected touch signals outputted by the touch sensing electrodes connected with the sensing signals during each of the first scanning periods, comprising:
determining a signal variation value which is not smaller than a first threshold value, the touch sensing electrode and the first scanning period corresponding to the signal variation value which is not smaller than the first threshold value according to the detected touch signals outputted by the touch sensing electrodes connected with the sensing signals during each of the first scanning period, and determining a coordinate of an intersection point of the determined touch sensing electrode and the touch driving electrode corresponding to the determined first scanning period as a coordinate of a touch object acting on the touch detection electrode.

9. The touch detection method according to claim 7, wherein, determining the size of pressure acting on the touch detection electrode according to the touch signals outputted by the touch sensing electrode in each of the second scanning period, comprising:
determining the touch sensing electrodes whose corresponding signal variation value is not smaller than a second threshold value according to the touch signals outputted by the touch sensing electrodes connected with sensing signals in each of the second scanning period, and performing a comprehensive analysis to the corresponding signal vibration value of the determined touch sensing electrodes, to obtain the size of pressure acting on the touch detection electrode.

10. A touch detection device based on the touch detection electrode according to claim 1, comprising:
a detecting unit, configured to, during the first time period, according to a set first scanning period, input scanning signals to the touch driving electrodes line-by-line, and detect touch signals outputted by the touch sensing electrodes connected with sensing signals in each of the first scanning period; and, during the second time period, according to a set second scanning period, input scanning signals to the touch driving electrodes line-by-line, and detect touch signals outputted by the touch sensing electrodes connected with the sensing signals in each of the second scanning period;
a processing unit, configured to determine a coordinate of a touch object acting on the touch detection electrode according to the touch signals outputted by the touch sensing electrodes connected with the sensing signals in each of the first scanning period in the first time period; and determine a size of the pressure acting on the touch detection electrode according to the touch signals outputted by the touch sensing electrodes connected with the sensing signals in each of the second scanning period in the second time period.

11. The touch detection device according to claim 10, wherein
the processing unit is configured to determine a signal variation value which is not smaller than a first threshold value according to detected touch signals outputted by the touch sensing electrodes connected with the sensing signals in each of the first scanning period, and the touch sensing electrode and the first scanning period corresponding to the signal variation value which is not smaller than the first threshold value, and determine a coordinate of an intersection point of the determined touch sensing electrode and the touch driving electrode corresponding to determined first scanning period as a coordinate of a touch object acting on the touch detection electrode; and determine the touch sensing electrode whose corresponding signal variation value which is not smaller than a second threshold value according to the touch signals outputted by the touch sensing electrode connected with the sensing signals in each of the second scanning period, and perform comprehensive analysis to the corresponding signal vibration value of the determined touch sensing electrode to obtain the size of pressure acting on the touch detection electrode.

* * * * *